United States Patent [19]

Fitko

[11] 3,908,049

[45] Sept. 23, 1975

[54] METHOD FOR COATING METAL SURFACES WITH AQUEOUS DISPERSIONS OF CARBOXYL CONTAINING POLYMERS

[75] Inventor: Chester W. Fitko, Chicago, Ill.

[73] Assignee: Continental Can Company, Inc., New York, N.Y.

[22] Filed: May 14, 1973

[21] Appl. No.: 359,955

Related U.S. Application Data

[63] Continuation-in-part of Ser. No. 259,637, June 5, 1972, abandoned.

[52] U.S. Cl. .... 427/386; 260/29.2 E; 260/29.4 UA; 260/29.6 NR; 260/837 R; 260/851; 427/236; 427/239; 427/388; 428/35; 428/418; 428/460; 428/461; 428/463
[51] Int. Cl.² .................... B05D 3/02; B32B 15/08
[58] Field of Search .... 260/29.4 UA, 29.6 NR, 837, 260/851, 29.2 E; 117/132 A, 97; 427/236, 239, 386, 388; 428/35, 418, 460, 461, 463

[56] References Cited
UNITED STATES PATENTS

| 2,411,590 | 11/1946 | Powell | 117/132 A |
|---|---|---|---|
| 2,600,681 | 6/1952 | Park et al. | 260/29.4 UA |
| 2,954,358 | 9/1960 | Hurwitz | 260/29.6 NR |
| 3,070,256 | 12/1962 | Bremmer et al. | 260/29.2 E |
| 3,245,932 | 4/1966 | Glavis et al. | 260/29.4 UA |
| 3,365,414 | 1/1968 | Fisk et al. | 260/33.4 |
| 3,378,477 | 4/1968 | Gentles et al. | 204/181 |
| 3,403,088 | 9/1968 | Hart | 204/181 |
| 3,598,770 | 8/1971 | Moore et al. | 260/837 X |

OTHER PUBLICATIONS

*Carboset Resins,* Supplement 2, GC–47, pp. 1 & 2 (11-1969).

*Primary Examiner*—Harry J. Gwinnell
*Attorney, Agent, or Firm*—Paul Shapiro; Joseph E. Kerwin; William A. Dittmann

[57] ABSTRACT

An aqueous dispersion containing a mixture of a neutralized water dispersible carboxyl acid containing polymer having a carboxyl content of at least 8% by weight, a water dispersible, heat-curable thermosetting aminoplast or polyepoxide resin and a water insoluble, long chain monohydroxy alcohol having 8–36 carbon atoms is applied to a metal surface and the surface is baked at a temperature of about 350°F to about 450°F to volatilize the alcohol and harden the coating.

12 Claims, No Drawings

3,908,049

METHOD FOR COATING METAL SURFACES WITH AQUEOUS DISPERSIONS OF CARBOXYL CONTAINING POLYMERS

This application is a continuation-in-part of my copending application Ser. No. 259,637 filed June 5, 1972, now abandoned.

BACKGROUND OF THE INVENTION

1. Field of the Invention

This invention is related to the coating of metal articles, and more particularly to coating metal articles with aqueous dispersions of carboxyl containing polymers.

2. The Prior Art

In the manufacture of metal containers, a protective synthetic resin coating is applied to the interior of the container. The synthetic resins which are employed for coating the interior of the metal container are generally heat-curable, resinous materials which are applied in the form of a solution or dispersion in a volatile organic solvent. The wet-coated metal surface is passed through an oven in which hot air is circulated to evaporate the solvent and to cure the coating material to the required hardness. The removal of the organic solvent creates an air pollution problem which many present day communities will not tolerate.

Among the various methods which have been proposed to avoid the use of organic solvents in preparing synthetic resin coatings for metal surfaces is to formulate the coating as an aqueous dispersion.

Aqueous dispersions of polymers having reactive carboxyl groups and heat curable thermosetting resins have been proposed by the art for application as coating materials to metal surfaces, e.g., U.S. Pat. Nos. 2,902,390, 2,954,358, 3,053,693, 3,094,435, 3,107,227, 3,378,477 and 3,403,088. These coating materials have not found wide commerical application in the food container industry because of the extremely high standards of coating integrity required for food containers, especially in those containers used for packaging carbonated beverages such as beer and soft drinks.

In the packaging of carbonated beverages, the interior coating film is subjected to an acidic liquid under high pressure. Under such demanding conditions, it is extremely critical that any coating applied to the interior of the container be as continuous and void-free as possible to avoid the consequences of corrosion of any exposed metal surface by the packaged carbonated liquid. While some aqueous dispersion coating materials have come close to meeting the requirements of the beverage industry, none has heretofore been wholly satisfactory.

SUMMARY OF THE INVENTION

In accordance with the present invention there is provided a process for coating metal surfaces with an adherent, integral coating film wherein an aqueous dispersion containing a mixture of a water dispersible carboxyl containing copolymer resin having a carboxyl content of at least 8 percent, the carboxyl groups being neutralized with an alkaline compound, a water dispersible heat curable thermosetting resin selected from aminoplast and polyepoxide resins and a water insoluble, long chain monohydroxy alcohol having 8 to 36 carbon atoms is applied to the metal surface and the surface heated to about 350° to about 450°F to volatilize the alcohol and harden the coating.

As will hereinafter be illustrated, by the application of aqueous coating compositions to metal surfaces such as aluminum and steel in accordance with the method of the present invention, there is provided a coating film of sufficiently low porosity and absence of voids that the applied coating meets the exacting specifications required for containers used by the carbonated beverage industry.

PREFERRED EMBODIMENTS

The carboxyl containing polymer resins used in the practice of the present invention are organic polymer resins containing free reactive carboxyl groups, the carboxyl content being at least 8 percent by weight. Such carboxyl containing polymer resins are well known to the art. Illustrative of these carboxyl containing polymers are the carboxyl containing acrylic resins and carboxyl containing olefin polymers. It is critical to the practice of the present invention that the carboxyl content of the carboxyl containing polymer be at least 8% by weight as it has been determined that neutralized carboxyl containing polymers having carboxyl contents of less than 8% are not readily dispersible in water and results in unstable coating dispersions.

The aqueous dispersions used in the practice of the present invention are prepared by dispersing the carboxyl acid containing polymer in water containing an amount of an alkaline compound sufficient to neutralize a major amount of the carboxylic acid units present in the carboxyl containing polymer to effect a dispersion of the polymer. Generally, the amount of alkaline material required to effect a stable dispersion is in the range of about 0.5 to about 1.0 stoichiometric equivalents per carboxyl group in the carboxyl containing polymer.

Among the various alkaline compounds which may be employed as neutralizing reagents to prepare the dispersions of the present invention are ammonia, ammonium hydroxide, secondary and tertiary amines, such as dimethylamine and trimethylamine, diethyl and triethyl amine and the like. However, $NH_4OH$ gives the best results in the simplest way and is accordingly, preferred.

The aminoplast resin or polyepoxide resin and the long chain monohydroxy alcohol are added to the dispersion of the carboxyl containing polymer. The aminoplast and epoxy resins generally disperse readily in the aqueous solution and although the long chain monohydroxy alcohols are water insoluble, the dispersions obtained with these alcohols are stable as it appears that the alkaline salts of the carboxyl acid containing polymers formed by the neutralization of the polymer with the alkaline compound are satisfactory dispersing agents for the water insoluble alcohols.

The term "carboxyl containing acrylic resin" as used herein includes within its meaning acrylic copolymers containing an ethylenically unsaturated carboxylic acid providing free reactive carboxylic acid groups with the balance of the copolymer being at least one alkyl ester of the unsaturated acid in which the alkyl group has 1 to 20 carbon atoms. The term "ethylenically unsaturated acid" as used herein includes within its meaning $\alpha, \beta$-ethylenically unsaturated carboxylic acids having from 3 to 8 carbon atoms such as, acrylic acid, methacrylic acid, itaconic acid, maleic acid, fumaric acid, monoesters of the unsaturated dicarboxylic acids, such as methyl hydrogen maleate, methyl hydrogen fumarate, ethyl hydrogen fumarate, and maleic anhydride. Although maleic anhydride is not a carboxylic acid in that it has no hydrogen attached to the carboxyl groups, it can be considered as an acid for the purposes of the present invention because of its chemical reactivity being that of an acid. Monocarboxylic acids such as acrylic acid, and methacrylic acid, are preferred in preparing the carboxyl containing acrylic resin.

The carboxyl content of the carboxyl containing acrylic resin ranges in an amount of from 8 to about 20 percent by weight, preferably from about 8 to about 15 weight percent, and most preferably about 10 weight percent. The balance of the polymer is made up of one or more of the alkyl esters of an ethylenically unsaturated carboxylic acid, the monocarboxylic acid esters being preferred. The alkyl esters of acrylic and methacrylic acid are especially preferred such as the alkyl acrylates and alkyl methacrylates including the methyl, propyl, butyl, hexyl, ethylhexyl, and lauryl acrylates and methacrylates. These alkyl esters may be used either singly or in combination with one another.

Carboxyl containing acrylic resins are available commercially. For example, CARBOSET 514H, an aqueous dispersed ethyl acrylate/methyl methacrylate/methacrylic acid terpolymer containing about 10% reactive carboxyl groups is manufactured by the B.F. Goodrich Chemical Company.

The term "carboxyl containing olefin copolymer" as used herein includes within its meaning copolymers of α-olefins with an ethylenically unsaturated carboxylic acid. The α-olefins employed in the copolymer are α-olefins which have the general formula $RCH=CH_2$ wherein R is either a hydrogen or an alkyl group having from 1 to 8 carbon atoms. Typical examples of suitable olefins include ethylene, propylene, butene-1, heptene-1, and 3-methylbutene-1. The concentration of the α-olefin in the copolymer is in the range of about 75 to about 90 weight percent and the concentration of acidic monomer is from about 10 weight percent to about 25 weight percent, and preferably, from 12 to 20 weight percent.

The carboxyl containing olefin copolymer need not necessarily be a two component polymer. Thus, although the olefin content of the copolymer should be about 75 to about 90 weight percent, more than one olefin can be employed to provide the hydrocarbon nature of the copolymer base. Additionally, any third copolymerizable monomer can be employed in combination with the olefin and the ethylenically unsaturated acid comonomer. The scope of copolymers suitable for use in the present invention is illustrated by the following examples: ethylene/acrylic acid copolymers, ethylene/methacrylic acid copolymers, ethylene/itaconic acid copolymers, ethylene/maleic acid copolymers, ethylene/acrylic acid/methyl methacrylate copolymers, ethylene/methacrylic acid/ethyl acrylate copolymers, ethylene/propylene/acrylic acid copolymers, ethylene/styrene/acrylic acid copolymers, ethylene/vinyl chloride/acrylic acid copolymers, polyethylene/acrylic acid graft copolymers, polyethylene/methacrylic acid graft copolymers, polypropylene/acrylic acid graft copolymers and polypropylene/methacrylic acid graft copolymers.

The heat curable, water dispersible thermosetting aminoplast resins employed in preparing the compositions used in the method of the present invention are aldehyde condensation products of amino-diazines and amino-triazines such as urea, melamine, benzoquanamine, acetoquanamine or a similar compound. Generally, the aldehyde employed is formaldehyde, although useful products can be made from other aldehydes, such as acetaldehyde, crotonaldehyde, acrolein, benzaldehyde, furfural, and others. The term aminoplast resin includes within its meaning the water dispersible alkylated condensates which result when the aminodiazine or triazine is reacted with the aldehyde in the presence of alcohols such as methanol or ethanol. Water dispersible alkylated melamine/formaldehyde condensates are the preferred aminoplast resins used in the practice of the present invention.

Water dispersible aminoplast resins of the type used to prepare the compositions of the present invention are available commerically. Examples of commercially available aminoplast resins which may be used in the present invention include UFORMITE MM83 which is a polycondensation product of melamine, formaldehyde and methanol, manufactured by Rohm and Haas and CYMEL 301 which is hexamethoxymethyl melamine, and is available from American Cyanamide.

The polyepoxides used in the preparation of the aqueous dispersions used in the practice of the present invention comprise those organic compounds containing at least two reactive epoxy groups, i.e.

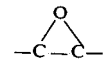

groups in their molecule. The polyepoxides may be saturated or unsaturated, aliphatic, cycloaliphatic, aromatic, or heterocylic and may be substituted if desired with non-intefering substituents.

Aromatic polyepoxides are the polymeric reaction products of polyhydric mono and polynuclear phenols with polyfunctional halohydrins and/or glycerol dichlorohydrin. A large number of polyepoxides of this type are disclosed in the Greenlee patents, U.S. Pat. Nos. 2,585,115 and 2,589,245. In addition, many of these resins are commercial products. Typical polyhydroxy phenols useful in the preparation of aromatic polyepoxides include resorcinol and various diphenols resulting from the condensation of phenol with aldehydes and ketones such as formaldehyde, acetaldehyde, acetone, methyl ethyl ketone and the like. A typical aromatic polyepoxide is the reaction product of epichlorohydrin and 2,2-bis (p-hydroxy phenyl) propane (Bisphenol A), the resin having the following structural formula:

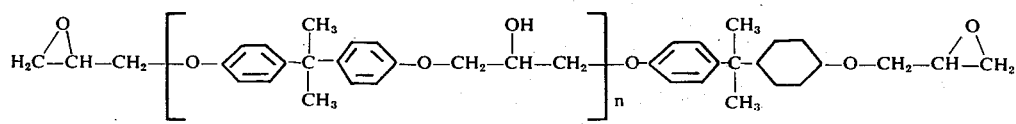

wherein n is 0 or an integer up to 10. Generally speaking, n will be no greater than 2 or 3 and is preferably about 1.

In EPON 826, an aromatic polyepoxide of the type described in the above formula and commercially available from the Shell Chemical Company, n is about 1.

Aliphatic polyepoxides are the reaction products of ephihalohydrins with aliphatic polyhydric alcohols such as trimethylol ethane, glycerol, pentaerythritol, sorbitol, trimethylol propane, erythritol, arabitol, mannitol, trimethylene glycol, tetramethylene glycol, ethylene glycol, polyethylene glycol, propylene glycol, polypropylene glycol, butylene glycol, polybutylene glycol and the like.

When using polyepoxide resins in the aqueous dispersions of the present invention it is desirable to incorporate 0.05 to 1 percent by weight of a polyamine catalyst such as ethylene diamine, diethylene triamine, tetraethylene pentamine or triethylene tetramine hydrochloride in the coating formulation.

The long chain monohydroxy alcohols used to prepare the coating compositions of the present invention are long chain, water insoluble monohydroxy alcohols having the general formula R—OH where R is a straight or branched chained saturated or unsaturated hydrocarbon group having from 8 to 36 carbon atoms. Illustrative of such alcohols are octyl alcohol, nonyl alcohol, decyl alcohol, tridecyl alcohol, lauryl alcohol, tetradecyl alcohol, cetyl alcohol, oleyl alcohol, linoleyl alcohol, palmitoleyl alcohol, arachidyl alcohol, stearyl alcohol, benhenyl alcohol, arachidonyl alcohol, myristoleyl alcohol and the like.

It is an essential and critical feature of the present invention that an alcohol be included in the aqueous coating composition and that the alcohol be a water insoluble, monohydroxy alcohol containing at least 8 carbon atoms. As will hereinafter be illustrated if a monohydroxy alcohol of at least 8 carbon atoms is not incorporated in the coating compositions of the present invention or if the alcohol is other than a monohydroxy alcohol, the applied coating will be of a quality unacceptable for metal container coating applications.

The solids content of the coating compositions of the present invention are comprised of about 80 to about 97 percent by weight and preferably about 85 to about 95 percent by weight of the carboxyl acid containing polymer, about 1 to about 10 percent by weight and preferably about 2 to about 7 percent by weight of the thermosetting aminoplast or epoxy resin and about 1 to about 15 percent by weight and preferably about 3 to about 12 percent by weight of the long chain monohydroxy alcohol.

The coating compositions of this invention can be satisfactorily applied at a solids content ranging from about 10 to about 45 percent by weight, based on the total weight of the aqueous dispersion. Generally, a solids content of about 20 to about 30 percent by weight is preferred.

The aqueous coating compositions of the present invention can be satisfactorily applied by any of the conventional methods employed by the coating industry. However, for coating the walls of metal containers, spray coating is a preferred method, as the desired coating weight is easily and conveniently applied in a single coating. For general coating purposes, roll, dipping and flow coating are also useful methods of application.

After applying the coating, the applied coating is cured by heating the coated metal substrate at a temperature of about 350°F to about 450°F for a period of about 1 to 10 minutes which is sufficient time for the monohydroxyl alcohol to be volatilized and the coating to harden to an acceptable degree.

The preferred coating weight for coating metal sheet substrates with an adequately protective organic coating suitable for carbonated beverage containers is in the range of 0.5 to 15.0 milligrams of polymer coating per square inch of exposed metal surfaces. To obtain this coating weight, the aqueous polymer dispersion is applied at a coating thickness of about 0.1 to 1.5 mils.

The present invention is illustrated, but not limited, by the following examples.

EXAMPLE 1

To 4750 grams of water containing 114 grams of 28% ammonium hydroxide was added 238 grams of hexamethoxymethylmelamine. To this mixture was added 9,500 grams of a carboxyl containing acrylic resin (CARBOSET 514H) and 114 grams of oleyl alcohol to prepare an aqueous coating dispersion.

The aqueous coating composition was spray coated on the inner walls of container bodies fabricated from tin-free steel plate coated with a polybutadiene primer of the type conventionally employed in the fabrication of carbonated beverage containers to provide acrylic resin coatings having a film weight of 4.5 to 6.5 milligrams per square inch. The coated container bodies were baked for 2 minutes at an oven temperature of about 385°F.

The procedure of the example was repeated with varying concentrations of oleyl alcohol as well as a variety of other long chain monohydroxy alcohols.

The quality of the coatings containing oleyl alcohol was evaluated visually as well as using the Enamel Rater test. The results of these evaluations are recorded in the Table below.

The Enamel Rater test provides an index of coating quality in terms of metal exposure. Under the conditions of this test, a low voltage is applied between an electrode immersed in an electrolyte (2% $Na_2SO_4$ solution) filled coated container body closed at one end. The presence of metal exposure is detected by a flow of current as indicated on an Enamel Rater meter available from the Wilkens-Anderson Company. Since the magnitude of current which flows is related to the total area of metal exposed to the electrolyte, the meter reading (in milliamperes) provides a relative measure of total exposed area on the coating surface. A completely non-porous coating will exhibit a very low or zero Enamel Rater result.

The visual evaluation of container bodies coated with carboxyl containing acrylic resin coating formulations containing a variety of other long chain monohydroxy alcohols in accordance with the procedure of Example 1 is also summarized in the Table below.

For purposes of contrast, as a control test, container bodies which has been coated in an identical manner to that of Example 1 but to whch a long chain monohydroxy alcohol had not been added to the coating dispersion or an alcohol outside the scope of the invention was substituted for the alcohols used in Example 1 were also visually evaluated. The results of these control tests (designated by the symbol "C") are also recorded in the Table.

TABLE

| Test No. | Alcohol Added To Acrylic Dispersion | Percent Alcohol Based on Solids | Enamel Rater Reading (ma) * | Visual Evaluation |
| --- | --- | --- | --- | --- |
| 1 | Oleyl | 2.6 | 0.74 | Smooth, Highly Glossy, Continuous Coating, |
| 2 | " | 3.9 | 0.43 | " |
| 3 | " | 8.3 | 0.23 | " |
| 4 | " | 11.9 | 0.05 | " |
| 5 | n-Octyl | 2.2 | — | Smooth, Highly Glossy, Continuous Coating. |
| 6 | Dodecyl | 2.2 | — | Smooth, Highly Glossy, Continuous Coating. |
| 7 | Tridecyl | 2.2 | — | Smooth, Highly Glossy, Continuous Coating. |
| 8 | 2-Ethyl hexyl | 2.2 | — | Smooth, Highly Glossy, Continuous Coating. |
| $C_1$ | — | 0 | — | Rough, Fisheyes, ** |
| $C_2$ | Safflower oil *** | 2.2 | — | Rough, Cloudy film, Fisheyes. |
| $C_3$ | Castor oil **** | 2.2 | — | Rough, many Fisheyes. |
| $C_4$ | Linseed oil ***** | 2.2 | — | Rough, Fisheyes. |
| $C_5$ | Epoxidized Linseed oil | 2.2 | — | Rough, Fisheyes. |
| $C_6$ | Mineral oil | 2.2 | — | Rough, Fisheyes. |
| $C_7$ | " | 8.3 | — | Rough, Fisheyes. |
| $C_8$ | Ethanol | 2.2 | — | Rough, Non-continuous Coverage. |
| $C_9$ | " | 10.0 | — | " |
| $C_{10}$ | Isopropanol | 2.2 | — | Rough, Non-continuous Coverage. |
| $C_{11}$ | Butanol | 2.2 | — | Rough, Non-continuous Coverage. |

\* Average of 8 tests
\*\* Circular blemish in coating
\*\*\* Saturated triglyceride
\*\*\*\* Saturated hydroxytriglyceride
\*\*\*\*\* Unsaturated triglyceride By reference to the Table, it is immediately apparent that the container bodies coated with carboxyl containing acrylic resin dispersions having a long chain monohydroxy alcohol incorporated therein in accordance with the method of the present invention are of much improved quality when compared to container bodies coated with a carboxyl containing acrylic resin dispersion in which such alcohols are absent.

EXAMPLE 2

The procedure of Example 1 was repeated using the following coating formulation:

| COMPONENT | GRAMS |
| --- | --- |
| Carboset 514 | 40 |
| EPON 826 | 2.5 |
| Water | 120 |
| Oleyl Alcohol | 1.2 |
| Ammonium Hydroxide | 1.2 |
| Triethylene Tetraamine Hydrochloride | 0.125 |

The baked coatings applied to aluminum surface were smooth, highly glossy coatings which had an average enamel rate reading of 0.49.

By way of contrast when identical coating formulations were prepared with the exception that oleyl alcohol was excluded, the baked coatings were rough and contained pinholes.

What is claimed is:

1. A method of coating metal surfaces which comprises applying to the metal surface an aqueous dispersion having dispersed therein a coating mixture comprised of (1) about 80 to about 97 percent by weight of a carboxyl containing polymer having at least 8 percent by weight carboxyl groups, a major portion of the carboxyl groups being neutralized with an alkaline compound to effect dispersion thereof, the polymer being comprised of an $\alpha$, $\beta$ -ethylenically unsaturated carboxyl acid having 3 to 8 carbon atoms, and a monomer selected from the group consisting of the alkyl esters of acrylic and methacrylic acids, (2) about 1 to about 10 percent by weight of a water dispersible, heat curable thermosetting resin selected from the group consisting of an aminoplast resin and a polyepoxide resin and (3) about [2]1 to 12 percent by weight of a water insoluble, long chain monohydroxyl alcohol having 8 to 36 carbon atoms and then heating the aqueous dispersion to a temperature between about 350° to about 450°F to volatilize the water and alcohol and cure and harden the coating mixture.

2. The method of claim 1 wherein the carboxyl containing polymer has a carboxyl content of 8 to about 25 percent by weight.

3. The method of claim 1 wherein the carboxyl containing compolymer is an ethyl acrylate/methyl methacrylate/methacrylic acid copolymer.

4. The method of claim 1 wherein said thermosetting resin is an aminoplast resin and is the water dispersible reaction product of melamine, formaldehyde and methanol.

5. The method of claim 1 wherein said thermosetting resin is a polyepoxide resin and is the reaction product of epichlorohydrin and 2,2-bis(p-hydroxyphenyl) propane.

6. The method of claim 1 wherein the alcohol is oleyl alcohol.

7. The method of claim 1 wherein the alcohol is n-octyl alcohol.

8. The method of claim 1 wherein the alcohol is dodecyl alcohol.

9. The method of claim 1 wherein the alcohol is tridecyl alcohol.

10. The method of claim 1 wherein the alcohol is ethylhexyl alcohol.

11. The method of claim 1 wherein the alkaline compound is ammonium hydroxide.

12. The method of claim 1 wherein the coating mixture contains 2.2 to 11.9 percent by weight of the alcohol.

* * * * *